F. J. WOLFF.
DOUGH LOAF SUPPORT OR RECEPTACLE.
APPLICATION FILED DEC. 18, 1914.
1,162,427.
Patented Nov. 30, 1915.
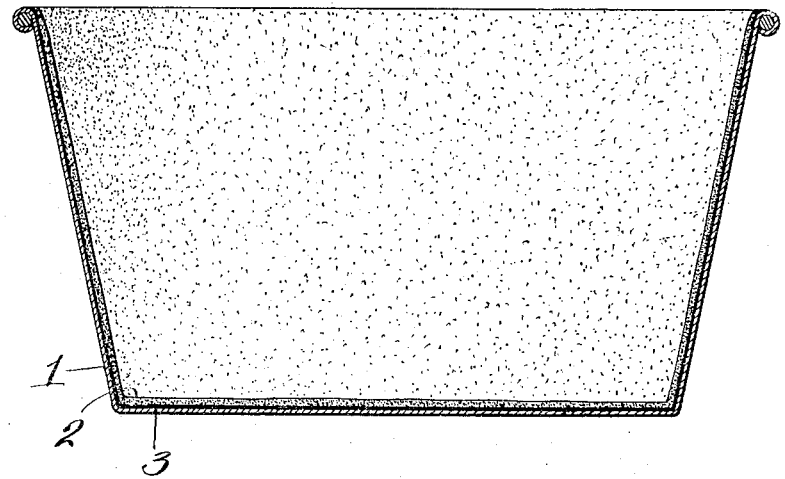
WITNESSES:
Frank R. Glore
H. C. Rodgers
INVENTOR
F. J. Wolff
BY
George H. Thorpe
ATTORNEY

UNITED STATES PATENT OFFICE.

FREDRICK J. WOLFF, OF BELLEVILLE, NEW JERSEY.

DOUGH-LOAF SUPPORT OR RECEPTACLE.

1,162,427.  Specification of Letters Patent.  Patented Nov. 30, 1915.

Application filed December 18, 1914. Serial No. 877,960.

*To all whom it may concern:*

Be it known that I, FREDRICK J. WOLFF, a citizen of the United States, residing at Belleville, in the county of Essex and State of New Jersey, have invented certain new and useful Improvements in Dough-Loaf Supports or Receptacles, of which the following is a specification.

This invention relates to bread or cake dough supports or receptacles, and the object is to produce devices of the character named to which dough resting thereon or therein will not adhere, so that the dough can be readily removed by picking it up manually or mechanically or ejected by tilting or overturning the support or receptacle.

It has been found in the use particularly of dough proofing machines, such for example as shown by my pending application No. 729,398, that flour in dough receptacles cannot be depended upon to reliably guard against adherence of the dough within the receptacles when the latter are overturned to discharge the dough loaves. It is essential to the satisfactory operation of such machines that every loaf shall be ejected from the receptacles when the latter perform their dumping operations. I have found that the most efficient and economical method is to provide such receptacles with an interior coating of the character hereinafter described, and that such coatings are also desirable on dough loaf supports, such as tables, chutes, belt conveyers and other flat supports and carriers used for proofing or as mere temporary supports or guides for the dough loaves. It is therefore to be understood that the use of the term supports contemplates stationary or movable flat surfaces or receptacles.

Referring now to the drawing which represents a central vertical section of a proofing receptacle, it will be seen that I show a walled receptacle 1, provided with an interior coating 2, (of exaggerated thickness) of a rough or pebbled character, the coating being caused to adhere to the receptacle by the use of binder 3, such as shellac or its equivalent.

The coating consists of a vegetable grit, such as corn flour, meal or grits, or in fact, any cereal containing practically no gluten. It is necessary that the grit shall be of a vegetable character so that should any of it become detached from the coating and adhere to the loaf it will not be noticeable or injurious to the consumer of the loaf when baked. With a coating of this character, practice has shown that the dusting of the support or dough loaf with flour is not essential to prevent the loaf from sticking to its support or receptacle.

In applying the coating the support is dipped into shellac (white shellac preferably) or the latter may be otherwise applied,—with a brush for example,—and the vegetable grit is dusted, sifted or otherwise applied to the shellac, and after the latter becomes dry, the surplus grit is shook, brushed, blown or otherwise discharged. The support or receptacle is then ready for use.

From the above description it will be apparent that I have produced a bread or cake dough support or receptacle embodying the features of advantage enumerated as desirable and I wish it to be understood that while I have illustrated and described the preferred materials for the coating and the preferred method of applying the same to the receptacle, I reserve the right to make all changes falling within the spirit and scope of the appended claim.

I claim:

A dough loaf support having its supporting surface provided with a permanent coating of vegetable grit, containing practically no gluten, upon which the loaf is adapted to rest, and a binder for holding the coating upon the support.

In testimony whereof, I affix my signature, in the presence of two witnesses.

FREDRICK J. WOLFF.

Witnesses:
J. F. VAN HATTEN,
F. H. WULF.

Copies of this patent may be obtained for five cents each, by addressing the "Commissioner of Patents, Washington, D. C."